United States Patent [19]

Walker

[11] 4,330,201
[45] May 18, 1982

[54] SCANNER DRIVE CLUTCH

[76] Inventor: Gary B. Walker, R.F.D. #1, Litchfield, N.H. 03051

[21] Appl. No.: 166,329

[22] Filed: Jul. 7, 1980

[51] Int. Cl.³ .................... G03B 27/48; G03B 27/50
[52] U.S. Cl. .................................. 355/50; 355/8; 355/11; 355/66
[58] Field of Search ............... 355/3 R, 8, 11, 50, 355/51, 57, 65, 66; 74/674, 111; 58/DIG. 1

[56] References Cited

U.S. PATENT DOCUMENTS 4,101,218  7/1978  Saruwatari et al. ............... 355/8 X Primary Examiner—Richard A. Wintercorn
Attorney, Agent, or Firm—Kenway & Jenney

[57] ABSTRACT

A forward and reverse chain drive systems for a scanner has a one-way clutch mounted on the drive shaft for the scanner cable pulley. The clutch has a sprocket wheel linked by a chain drive to a reverse motor to turn the drive shaft in a first rotation direction when the reverse motor is energized. The sprocket wheel is free to rotate in the other rotation direction independently of the drive shaft so that when the reverse motor is de-energized at the end of the scanner reverse movement, the chain drive may move the clutch sprocket wheel in that other direction, as the chain reacts to reverse motor turn-off, without changing the position of the drive shaft.

3 Claims, 3 Drawing Figures

SCANNER DRIVE CLUTCH

BACKGROUND

This invention relates generally to photocopiers and particularly to scanner drive assemblies for photocopiers.

Ordinarily the image that is copied in a photocopier is obtained from the original by scanning it. That is, a scanning assembly is effectively moved past the original, or the original, on a copyboard, is moved past a fixed lens arrangement. The image is relayed from successive portions of the original to the photosensitive drum of the photocopier and a copy is eventually made by transferring a developed image from the drum to a sheet of transfer material.

The relative movement of the original and the lens arrangement must be smooth and, preferably, rapid, for accurate, quick copying, the desired end of the typical photocopying system. The twin goals of smoothness and rapidity are to some extent inconsistent, since the rapid motion of the generally reciprocating scanning system will lead to abrupt starts and stops that jar the system.

Also, if there is any slippage of the relative position of elements in the system, the careful registration or correspondence of one element of the system to another may be lost. The abrupt starts and stops of the typical scanning system, made up of cables, chain drives and motor shafts, can lead to loss of reliable registration unless the system is carefully designed.

One typical scanner drive system employs a chain drive to turn a scanner cable pulley to move a scanning element (lens or mirror system or copyboard) back and forth. In one direction, the pulley is driven off the main photocopier drive shaft. On the return, the pulley is driven by a reverse motor, the connecting elements in the drive being sprocket wheels and a drive chain loop. In practice, it has been found that some "jitter" and loss of registration has occurred as a result of movement of the chain loop at the end of the return step.

Accordingly, it is an object of this invention to provide an improved scanner drive assembly that minimizes jitter and loss of registration. It is a further object to provide an inexpensive and reliable scanner drive system with minimum modification of existing systems.

SUMMARY OF THE INVENTION

This invention provides a differential drive mechanism in a photocopier drive assembly for reciprocal movement of a scanning element. A rotatable drive shaft is coupled to the scanning element to move the scanning element in response to rotation of the drive shaft. A first drive mechanism acts to rotate the drive shaft in a first rotation direction to move the scanning element, and a second drive mechanism acts to rotate the drive shaft in a second rotation direction, to return the scanning element to its starting position.

The second drive mechanism includes a driver member, linking driving means, and a differential drive mechanism with a first element connected to the drive shaft and a second element arranged with respect to the first element to move together with it when the second element is moved in a first differential drive direction and to move independently of the first element when the second element is moved in a second differential direction. The linking driving means drivingly connects the driver member to the second element when the driver member is energized to move the second element in the first differential direction while returning the scanning element to its starting position. The second element may move independently of the first element when the driver member is de-energized In a preferred embodiment, the driver member has a sprocket wheel linked by a chain loop to the sprocket wheel of a one way clutch mounted on the drive shaft. The sprocket wheel is engaged with a high frictional relationship to the hub portion of the clutch, fixed to the drive shaft, when the motor drives the chain to turn the drive shaft in the second direction. The sprocket wheel of the clutch has negligible frictional relationship with the clutch hub when it turns in the opposite direction.

BRIEF DESCRIPTION OF THE DRAWING

Other objects, features and advantages of the invention will be pointed out hereinafter or will be apparent from the following description of a preferred embodiment, including the drawing thereof, in which.

DESCRIPTION OF A PREFERRED EMBODIMENT

Figure 1:
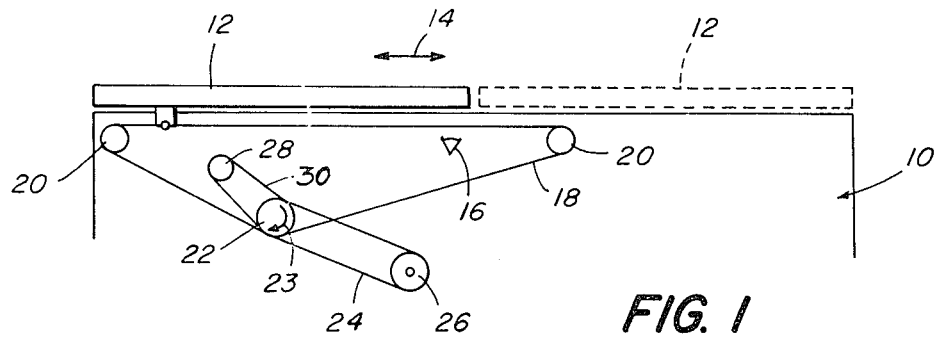
FIG. 1 is a diagrammatic representation of a scanning system in a photocopier, according to the invention.

There is shown in FIG. 1, the top portion of a photocopy machine 10, including a copyboard 12 reciprocally movable in the direction of the arrows 14 between the positions shown by the full line representation and the broken line representation. A lens arrangement 16 is indicated below the copyboard 12, where it will direct to the copier drum (not shown) successive portions of the image of the original supported in the copyboard 12, as the copyboard 12 moves in a first direction (from left to right). After the copyboard 12 has moved as far to the right as possible (and occupies the position indicated by the broken line representation), it will be returned to its original position, to repeat the procedure if another copy is desired or to have another original inserted to be copied.

The copyboard 12 is moved by a cable 18 attached to the copyboard and wound around pulleys 20 mounted in the copier 10. The cable 18 is moved by rotation of the cable spindle 22. The copyboard 12 is moved in its first direction (to the right in FIG. 1) when the cable spindle 22 is rotated in the clockwise direction, shown by the arrow 23. The spindle 22 is rotated by the action of a forward drive chain loop 24 driven by a main drive sprocket wheel 26 powered by the main drive shaft (not shown) of the photocopier 10. The copyboard 12 is returned in the other direction (back from right to left) also by the spindle 22, this time driven by reverse motor 28, connected to the spindle 22, in a way shown in greater detail later, by a reverse drive chain loop 30.

Figure 2:
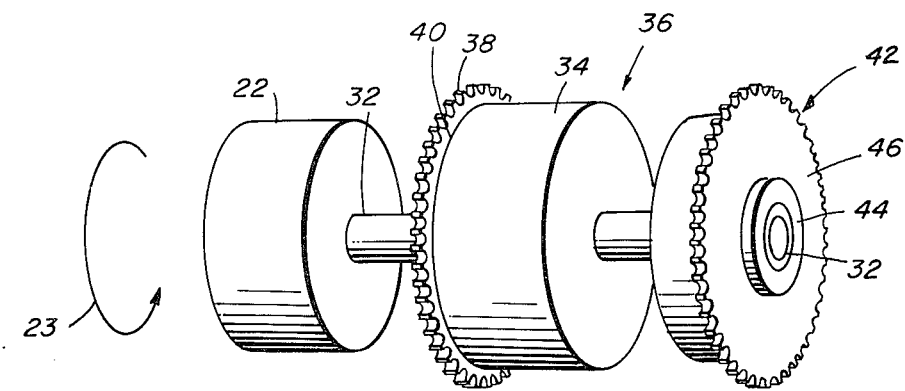
FIG. 2 is a perspective representation of the scanning system drive shaft of FIG. 1, and elements mounted on it.

Referring now to FIG. 2, the cable spindle 22 is shown fixed to a scanner drive shaft 32. Also fixed to the drive shaft 32 is armature portion 34 of an electromagnetic clutch 36. A forward drive sprocket wheel 38 is mounted on the drive shaft 32 and may rotate freely relative to it. The sprocket wheel 38 is, however, connected to a rotor portion 40 of the electromagnetic clutch 36, and when the electromagnetic clutch 36 is energized, the forward drive sprocket wheel 38 is, in effect, fixed to the drive shaft 32 to rotate with it.

The forward drive sprocket wheel 38 is driven by the forward drive chain loop 24 off the main drive of the photocopier 10, and constantly turns in a clockwise direction while the photocopier 10 is operated. The wheel 38 only turns the scanner drive shaft 32, however, when the electromagnetic clutch 36 is energized. The clutch 36 is energized when it is desired to move the copyboard 12 across the top of the photocopier 10, from left to right (in FIG. 1) so that an original can be scanned.

Figure 3:
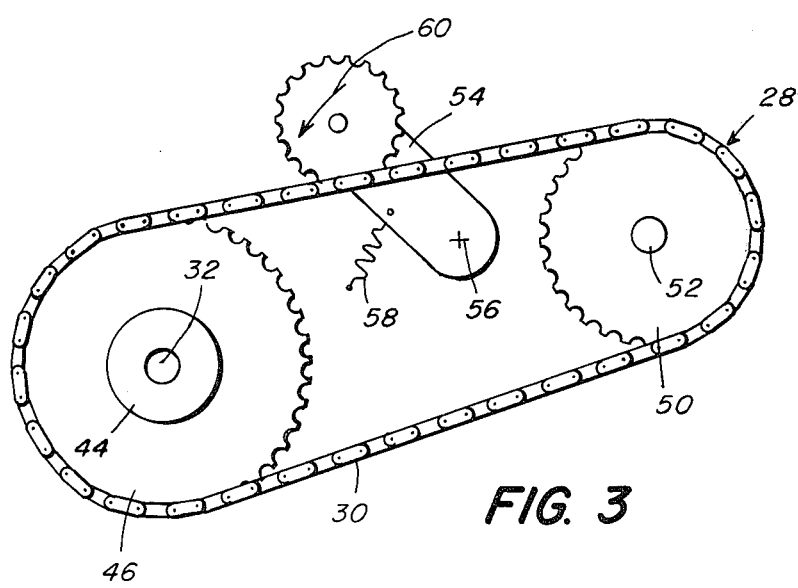
FIG. 3 is a diagrammatic representation of the reverse motor, drive chain loop, tensioner and one-way clutch of the scanner drive system.

A one-way clutch 41 is mounted on the end of the drive shaft 32. The clutch has an inner hub 44 and an outer hub 42. The inner hub 44 is mounted in a fixed rotational relationship to the drive shaft 32. Outer clutch hub 42 is fixed to the sprocket wheel 46. The relation between these elements, the inner hub 44 and the sprocket wheel 46, is that of a differential drive mechanism. If the sprocket wheel 46 is turned clockwise (as seen in FIG. 3), the clutch is arranged so that there is a high frictional relationship between sprocket wheel 46 and hub 44, and hub 44 (and drive shaft 32) will turn also. If the sprocket wheel 46 is turned counterclockwise (as seen in FIG. 3) the clutch is arranged so that there is a low, negligible, frictional relationship between the sprocket wheel 46 and the hub 44. In other words, the sprocket wheel 46 can be turned counterclockwise without moving the hub 44 or the drive shaft 32.

FIG. 3 shows the reverse motor drive assembly including the reverse motor 28, a reverse motor drive sprocket 50 fixed to a reverse motor shaft 52, and the reverse drive chain loop 30 providing the connecting driving linkage between the reverse motor 28 and the clutch sprocket wheel 46. A tensioner 54 is shown, pivotable about an axis 56, and biased by a spring 58 in the direction of the arrow 60 to maintain tension in the reverse chain loop 30.

In operation of the scanner drive assembly, forward motion of copyboard 12 is initiated by engaging the electromagnetic clutch 36. This connects the forward drive sprocket wheel 38, driven by the forward chain drive loop 24, to the scanner drive shaft 32, rotating the cable spindle 22 in a first direction 23. The copyboard 12 moves across the lens arrangement 16 to the right (to the position shown by the broken line representation). The reverse motor 28 is, incidentally, turned by the reverse drive chain loop 30 because the loop is connected to the drive shaft 32 through the one way clutch sprocket wheel 46. However, the reverse motor 28 is not energized at this time and the motor shaft 52 freely rotates.

Then the electromagnetic clutch 36 is disengaged and the reverse motor 28 is energized. The reverse motor 28 rotates in a clockwise direction as seen in FIG. 3 when energized, and drives the reverse drive chain loop 30 clockwise as seen in FIG. 3. The reverse drive chain loop 30 turns the clutch sprocket wheel 46 clockwise also, and, therefore, turns also the clutch hub 44, turning the scanner drive shaft 32. This rotation of the drive shaft 32 is opposite its first direction, so the copyboard 12 is returned to its starting position (the solid line representation in FIG. 1).

As soon as the copyboard 12 returns to the limit of its travel and its original position the cable spindle 22 ceases turning, and the reverse motor 28 is de-energized. However, as a result, it is thought, of the resettling of the dynamic forces generated when the chain loop 30 is relaxed after being in tension (at the top) during the reverse drive, there is a tendency, it appears, for the chain loop 30 to shift, in a counterclockwise (as seen in FIG. 3) movement, that would rotate the drive shaft 32 correspondingly. This movement of the drive shaft 32 is undesirable because it shifts the cable spindle 22, and, hence, the position of the copyboard 12, affecting adversely, the registration of the copyboard 12 with the remainder of the photocopier elements, such as the photosensitive drum.

With the one-way clutch 41 provided by the invention, however, the problem is eliminated. If there is any "backlash" counterclockwise (FIG. 3) movement by reverse drive chain loop 30, it is absorbed by movement of the clutch sprocket wheel 46 without movement of the clutch inner hub 44 (and, correspondingly, without movement of the drive shaft 32 or cable spindle 22). This is because in the direction reverse to that taken during the time when the reverse motor 28 was driving the clutch sprocket wheel 46 by way of the reverse chain drive 30, there is negligible frictional relationship between clutch sprocket wheel 46 and hub 44, and sprocket wheel 46 may move freely.

Other differential drive mechanisms beside that shown in the preferred embodiment may, of course, be used to transfer power to the drive shaft from the chain loop driven by the reverse motor when the motor is energized, and to slip when the motor is de-energized so that no drive chain backlash is transferred to the drive shaft at the end of the scanning cycle. Whether a separate reverse motor or just different linkage to the same device as is used for forward movement is used to drive the copyboard back, is a matter of design choice, and the need for the invention is likely to occur in the latter situation also.

The advantages of the invention include the reliability of the scanner drive system that results from the reliability of the registration of the copyboard after it is returned to its starting position. The reverse drive chain is made effective when it is being used to drive the scanner, and is made ineffective when it is not being so used, to distort the position of the scanner drive shaft.

Furthermore, the differential drive mechanism of the assembly may be inserted into the drive systems for scanners in existing photocopiers—as substitutes for sprocket wheels or similar devices fixed to a drive shaft—and thereby increase their reliability in an easy, convenient procedure.

Additions to, deletions from, or other modifications of the described preferred embodiment will occur to those skilled in the art, and are considered to nevertheless fall within the scope of the invention, as defined by the following claims.

I claim:

1. A photocopier scanner drive assembly for reciprocal movement of a scanning element comprising:
   a rotatable drive shaft coupled to said scanning element to move said scanning element in response to rotation of said drive shaft,
   first drive means for rotating said drive shaft in a first rotation direction, and
   second drive means for rotating said drive shaft in a second rotation direction to return said scanning element to a starting position, comprising:
   an energizable driver member, a differential one way drive mechanism having a first element connected to said drive shaft, and a second element arranged with respect to the first element to move together with it when the second element is moved in a first differential drive direction, and to move independently of the first element when the second element is moved in a second differential drive direction, a linking driving means drivingly connecting said driver member to said second element when said driver member is energized to move the second element in said first differential direction and said drive shaft in said second rotation direction while returning said scanning element to its starting position.

2. A photocopier scanner drive assembly for reciprocal movement of a scanning element comprising:

a rotatable drive shaft coupled to said scanning element to move said scanning element in response to rotation of said drive shaft, first drive means for rotating said drive shaft in a first rotation direction, and second drive means for rotating said drive shaft in a second rotation direction to return said scanning element to a starting position, comprising:

a driver member, a differential drive mechanism having a first element connected to said drive shaft, and a second element arranged with respect to the first element to move together with it when the second element is moved in a first differential drive direction, and to move independently of the first element when the second element is moved in a second differential drive direction, a linking driving means drivingly connecting said driver member to said second element when said driver member is energized to move the second element in said first differential direction while returning said scanning element to its starting position, wherein said differential drive mechanism comprises:

a first rotor element rotationally fixed to said drive shaft, and a second rotor element rotatably mounted on said first rotor element, said first and second rotor elements having a direction dependent frictional relationship, said elements having a high frictional relationship when said second element is turned by said linking driving means in the direction urged by said energized driver and a low frictional relationship when said second element is turned in the other direction.

3. A photocopier scanner drive assembly for reciprocal movement of a scanning element comprising:

a rotatable drive shaft coupled to said scanning element to move said scanning element in response to rotation of said drive shaft, first drive means for rotating said drive shaft in a first rotation direction, and second drive means for rotating said drive shaft in a second rotation direction to return said scanning element to a starting position, comprising:

a driver member, a differential drive mechanism having a first element connected to said drive shaft, and a second element arranged with respect to the first element to move together with it when the second element is moved in a first differential drive direction, and to move independently of the first element when the second element is moved in a second differential drive direction, a linking driving means drivingly connecting said driver member to said second element when said driver member is energized to move the second element in said first differential direction while returning said scanning element to its starting position, wherein:

said driver member includes a reverse sprocket wheel, said differential drive mechanism comprises a one-way clutch having a hub element fixed to said drive shaft, and a clutch sprocket wheel mounted on said hub and arranged to rotate said hub when said wheel is turned in a first direction and to rotate free of said hub when said wheel is turned in a second direction, and said linking driving means comprises a chain loop connecting said reverse sprocket wheel and said clutch sprocket wheel.

* * * * *